United States Patent [19]

Bovo et al.

[11] Patent Number: 4,975,946
[45] Date of Patent: Dec. 4, 1990

[54] CONVERTIBLE SWITCHED TELEPHONE EXCHANGE

[75] Inventors: Amilcare Bovo, Milan; Luigi Canato, Meda, both of Italy

[73] Assignee: Italtel Societa Italiana, Milan, Italy

[21] Appl. No.: 350,736

[22] PCT Filed: Oct. 12, 1987

[86] PCT No.: PCT/EP87/00602

§ 371 Date: May 1, 1989

§ 102(e) Date: May 1, 1989

[87] PCT Pub. No.: WO88/03737

PCT Pub. Date: May 19, 1988

[30] Foreign Application Priority Data

Nov. 3, 1986 [IT] Italy ................................ 22211 A/86

[51] Int. Cl.$^5$ ...................... H04Q 11/04; H04Q 3/545
[52] U.S. Cl. ................................... 379/269; 379/221; 370/56; 370/58.3
[58] Field of Search ............... 379/221, 220, 269, 333; 370/56, 58.3

[56] References Cited

U.S. PATENT DOCUMENTS 4,472,798  9/1984  Hafer ..................................... 370/14

FOREIGN PATENT DOCUMENTS 0073078  8/1982  European Pat. Off. .
0235406  12/1986  European Pat. Off. .

OTHER PUBLICATIONS

Skaperda, N. J., "Generic Digital Switching System", Internation Switching Symposium, Oct. 25–29, 1976, Session 223, pp. 1–8.
Oliver, G. P., "Architecture of System X, Part 3—Local Exchanges", Post Office Electrical Engineers Journal, vol. 73, (Apr. 1980), pp. 27–34.
IBM Technical Disclosure Bulletin, vol. 28, No. 7, Dec. 1985, "Ten–Thousand–Line Digital Central Office".

Primary Examiner—James L. Dwyer

[57] ABSTRACT

A switched telephone exchange that comprises a plurality of modules designed to use a connection network of the "mesh" type to implement medium—low potential exchanges (i.e. 20,000 users) or a connection network of the centralized type—by means of adaption circuits—to implement high potential exchanges (i.e. 100,000 users). This characteristic permits the installation of medium to low capacity exchanges, which have low costs as they do not have any centralized organs, and their subsequent "conversion" into high potential exchanges when there is a large increase in user traffic. The adaption circuits comprise parallel to serial conversion facilities-(IFT) for the voice signals, line facilities (ULL), signalling processing facilities (USI) for the signalling exchanged between the individual modules of the switched exchange, serial to parallel conversion facilities (IFR) for the voice signals.

5 Claims, 8 Drawing Sheets

CONVERTIBLE SWITCHED TELEPHONE EXCHANGE

BACKGROUND OF THE INVENTION

This invention relates to a digital type switched telephone exchange that is designed to use a mesh type connection network to implement medium to low potential exchanges (eg. 20,000 users) or a centralized type connection network to implement high potential exchanges (eg. 100,000 users).

Modern digital switching exchanges usually include a plurality of switching modules designed to make telephone links either autonomously on their own, or alternatively through connection networks if the called party is connected to a different module than the module to which the caller is connected.

Accordingly, the cost of this type of exchange is a function of the cost of the modules and the cost of the connection network.

The cost of the modules is more or less proportional to the number of lines connected to the switched exchange while the cost of the connection network is practically independent from the number of the lines and assumes a predetermined entity, even in the presence of small capacity exchanges. Therefore, the cost of the centralized portions (connection network) constitutes the so-called starting point "base" and the cost of the exchange is not proportional to the number of lines installed in the exchange.

In order to minimize the cost per line and to allow the exchange to grow in a linear manner, a switched exchange has been developed with a mesh type connection network for keeping with the increase in the number of installed lines, (i.e. an exchange made only of connection wires and completely void of centralized organs as a consequence), which includes a voice switching section and a signalized switching section.

This type of exchange has optimum requisites as far as costs are concerned but has a saturation limit of approximately 20,000 users, that is determined from the complexity assumed by the network when the limit tends to be exceeded.

SUMMARY OF THE INVENTION

An object of the present invention is to create a switched telephone exchange which allows a mesh type network to be used in order to optimize the costs involved, as described above. At the same time, a centralized connection network is also allowed to be used, in order to convert the exchange into a high potential exchange, whenever an increase in user traffic occurs which exceeds the saturation limit.

Another object of the present invention is to provide a switched telephone exchange which includes a Plurality of modules (described in European Patent No. 73,078) designed to output/receive digital words on a voice connection network. The digital words are in a parallel form codes on H bits having I information bits, R redundancy bits and S service bits and each module includes an access unit, a concentration unit and a control circuit. The modules also include an adaptation circuit to make telephone links through a connection network of the mesh type or through a connection network of the centralized type. The centralized connection network includes a plurality of sections for switching voice signals and a distributor module for distributing signals to the modules and/or the plurality sections. A centralized connection network is conventional and centralized connection is described in the European Application No. 235,406 for example.

The adaption circuits comprise:

parallel to serial conversion means designed to receive a data stream on their input containing digital words in a parallel form coded on H bits, which is available on the output of the concentration unit, and to convert the digital words into a plurality of data streams containing digital words in a serial form coded on I bits;

a plurality of line means designed to receive the serial data streams output by the parallel to serial conversion means or else by the connection network, on their input, after alignment operations have been carried out, and also designed to forward the serial data streams to the connection network, or to serial to parallel conversion means, after having carried out code conversion operations;

signalling processing means designed to receive/forward to the control circuit all words corresponding to signals picked up by the access unit, to structure said words in a message form, to exchange said messages with the message distributor module; and serial to parallel conversion means designed to receive a plurality of data streams containing digital words in a serial form coded on I bits from the line facilities and also to convert the digital words into a data flow containing words in a parallel form coded on H bits.

The exchange described above achieves the objects for medium to low potentials and allows a mesh type connection network exchange to be used. When the saturation limit is reached, the exchange can be transformed into a high potential exchange by using a centralized connection network and the adaption circuits as described above.

BRIEF DESCRIPTIONS OF THE DRAWINGS

Further characteristics of the invention will be made clear by the following description concerning an example that is in no way to be considered limitative in the use of the invention and is completed by the enclosed drawings in which.

Figure 4:
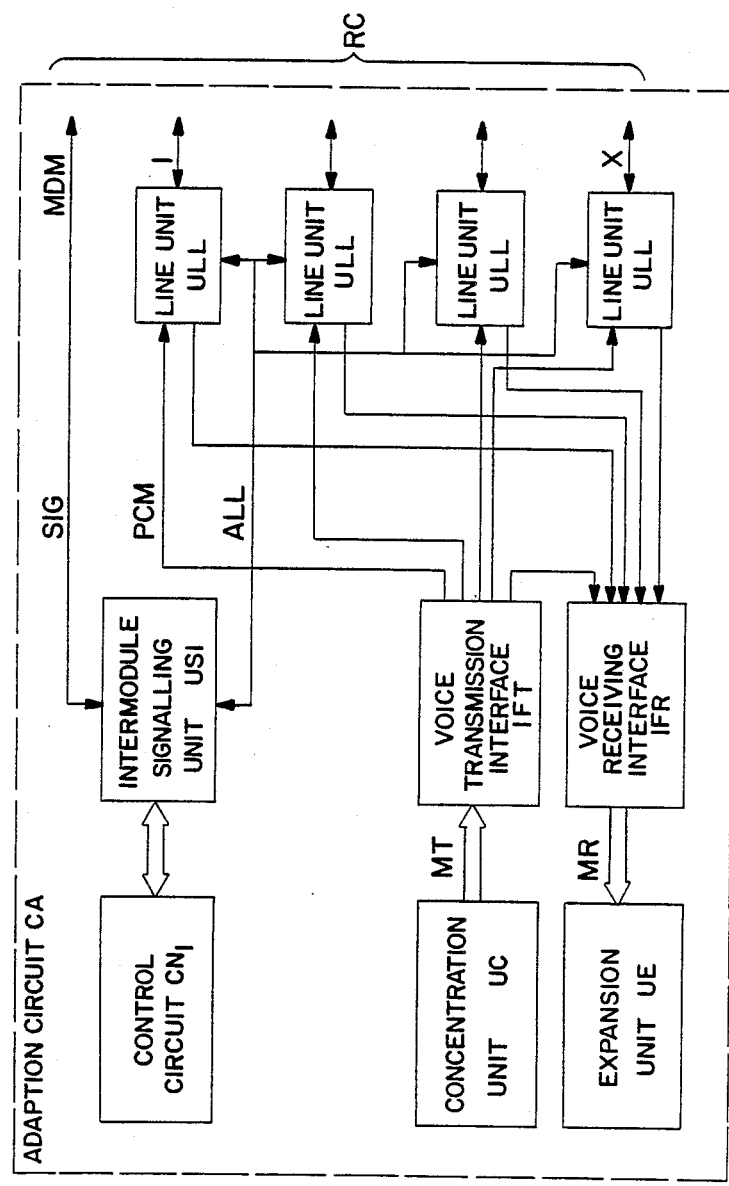
FIG. 4 illustrates a block diagram of the adaption circuits CA illustrated in FIG. 3.
Figure 7:
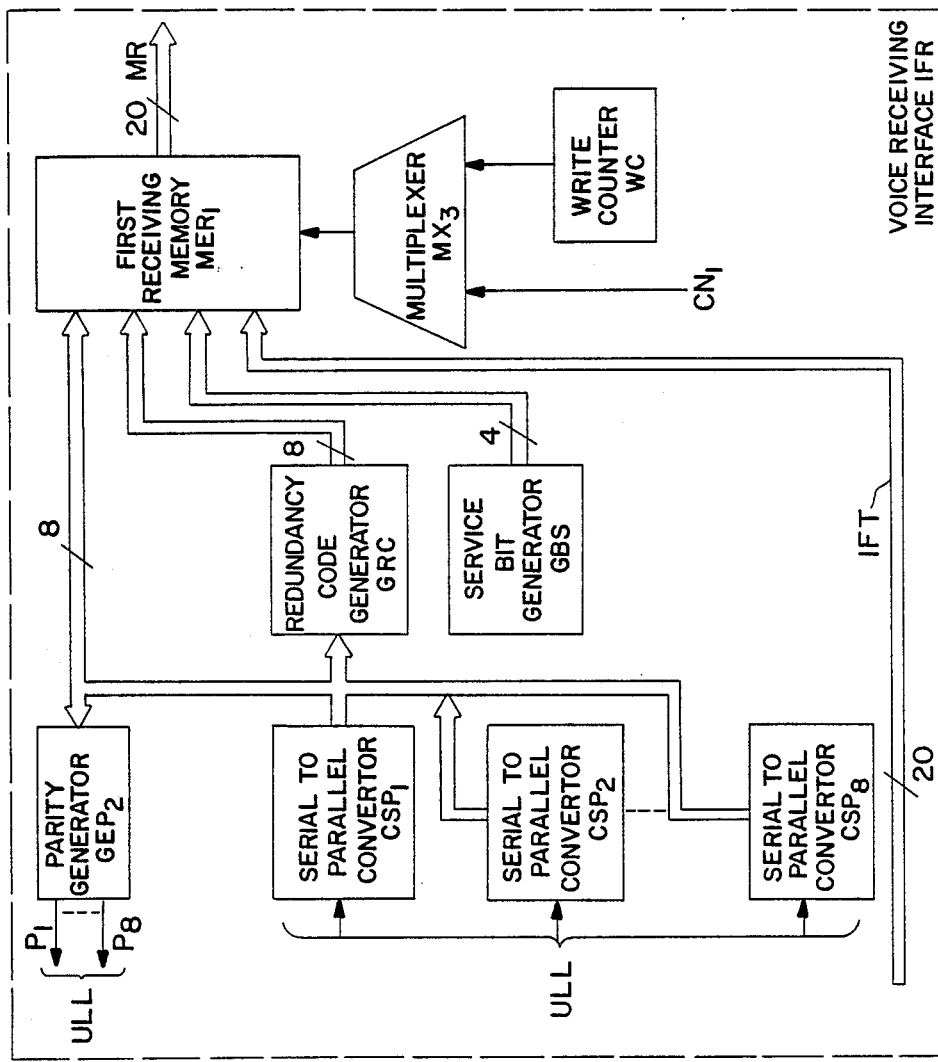
Figure 8:
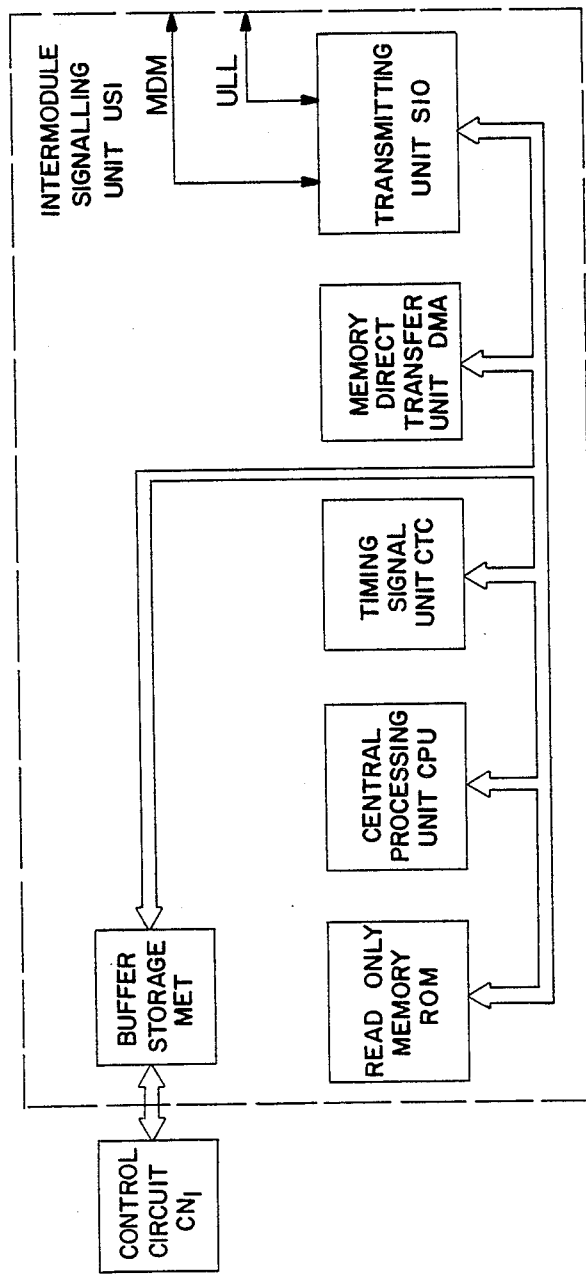

FIG. 7 illustrated a block diagram of the receiving voice interface IFR illustrated in FIG. 4; and FIG. 8 illustrates a block diagram of the intermodule signalling unit USI illustrated in FIG. 4.

DESCRIPTION OF THE PREFERRED EMBODIMENTS OF THE PRESENT INVENTION

Figure 1:
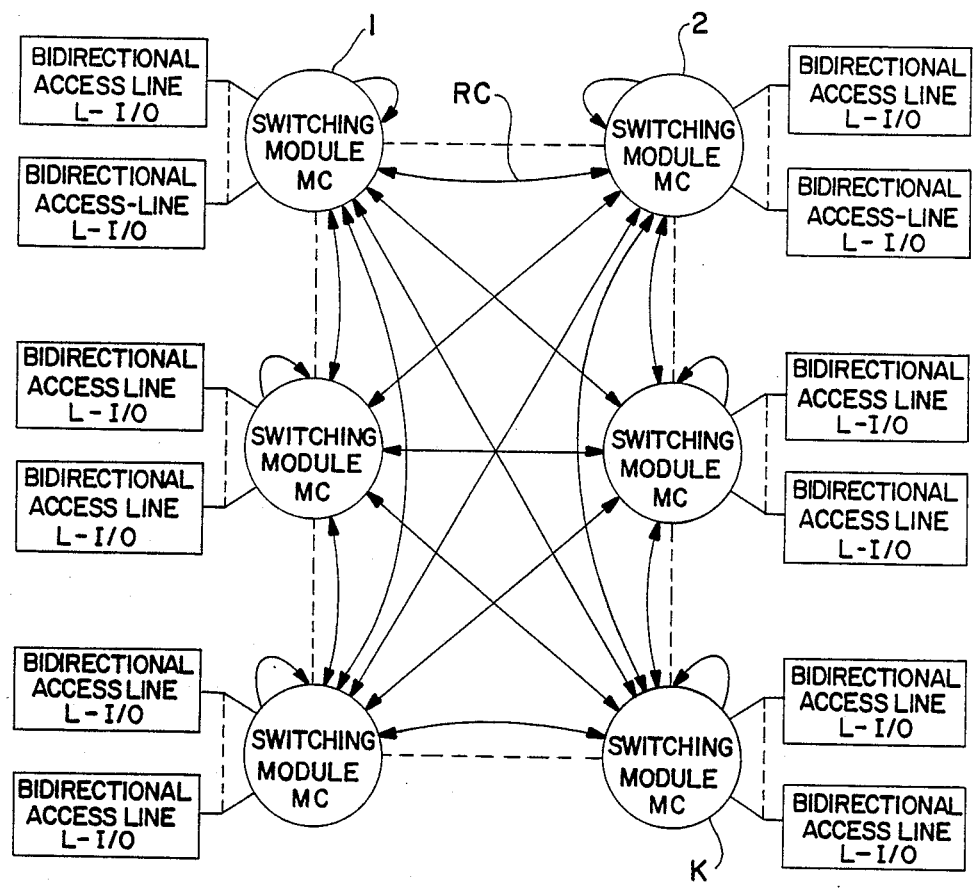
FIG. 1 illustrates a block diagram of the switched telephone exchange according to an embodiment of the invention having a mesh type connection network.

FIG. 1 illustrates a block diagram of the switched telephone exchange made according to the present invention that is equipped with a mesh type connection network RC designed to implement medium - low potential exchanges (as described in U.S. Pat. No. 4,597,075 which corresponds to the European Patent No. 73,078). A plurality of switching modules MC are connected to the RC network and bidirectional access lines L-I/O are connected thereto.

Furthermore, each MC module is linked to all the other modules. Each MC module also receives the outputs of the module at the input of the module by having telephone links between two lines L connected to the same M-I/O module.

The fact that each voice link is made from a bundle of 20 wires designed to allow parallel transmission of digital words coded on 20 bits must be kept in mind. On the other hand, intermodule signals are transmitted by 4 wires and each pair of MC modules is actually connected by 24 wires as a consequence, even if in FIG. 1 for the sake of simplicity, just one single link is represented. The L-I/O lines can have telephone sets, telegraph apparatus, data terminals, etc. connected to them.

Figure 2:
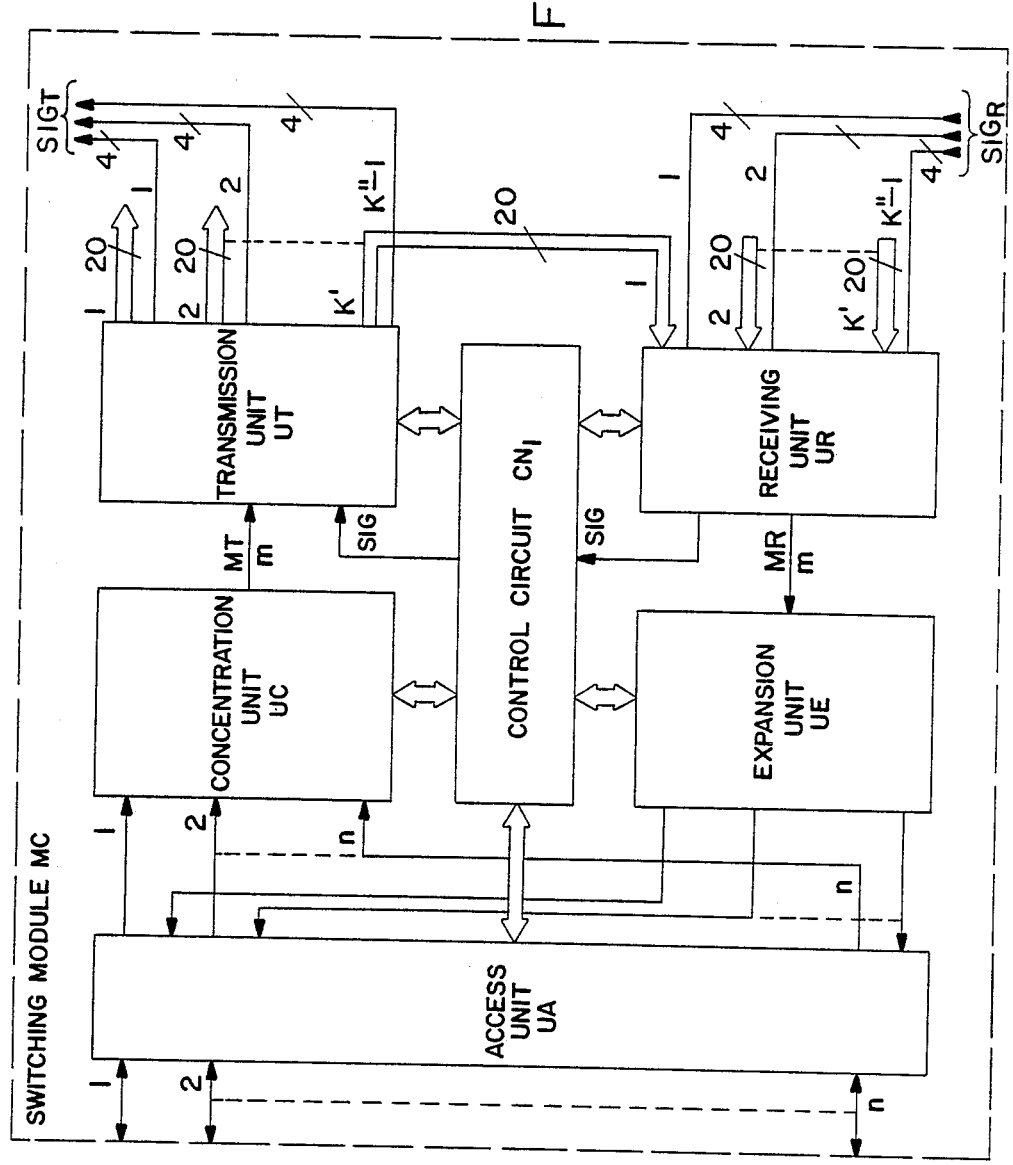
FIG. 2 illustrates a block diagram for one of the switching modules MC illustrated in FIG. 1.

FIG. 2 illustrates a block diagram of a generical switching module MC Which includes an access unit UA having n directional lines connected thereto. The digital outputs of the UA unit are input to a concentration unit UC designed to associate the n inputs to temporal phases of a transmission multiple MT connected to a transmission unit UT with a number K of outputs equivalent to the number of MC switching modules.

In particular, the UT unit includes K' outputs for transmitting signals thereto and also K'-1 links are included for transmitting the signal $SIG_T$ directed towards the remaining K-1 MC modules therethrough. One of the K' outputs of the UT unit concerning the voice signals forms a closed loop around the module itself. The receiving section of the modules in question includes a receiving unit UR into which the K'-1 outputs of the other modules corresponding to voice signals are input, as well as the loop and K''-1 links corresponding to the signal $SIG_R$ received from the other MC modules. The UR unit is designed to associate the K' links to the m temporal phases of a receiving multiple MR which is connected to an expansion unit UE with n outputs directed to the access unit UA. The MC module also includes a control circuit $CN_1$ for receiving data relating to signals from the access unit UA, directing the concentration/expansion operations in response to the data, and forwarding to the transmission unit UT, or receiving from the receiving unit UR, the $SIG_T$ signal or the $SIG_R$ signal.

The connection network of the exchange in question, as described above, includes multiples of wires. In particular, the digital words corresponding to the voice signals are transmitted by multiples of 20 wires designed to allow the transmission of 20 bits in parallel which, in addition to the 8 information bits, also include redundancy bits, service bits, control bits, etc. On the other hand the digital words corresponding to the signals are transmitted by multiples of 4 wires.

In actual practice it has been found that the saturation limit of the switched exchange described above is approximately 20,000 users. This limit is particularly due to the complexity that the connection network between the various M-I/O modules assumes when this limit tends to be exceeded.

Figure 3:
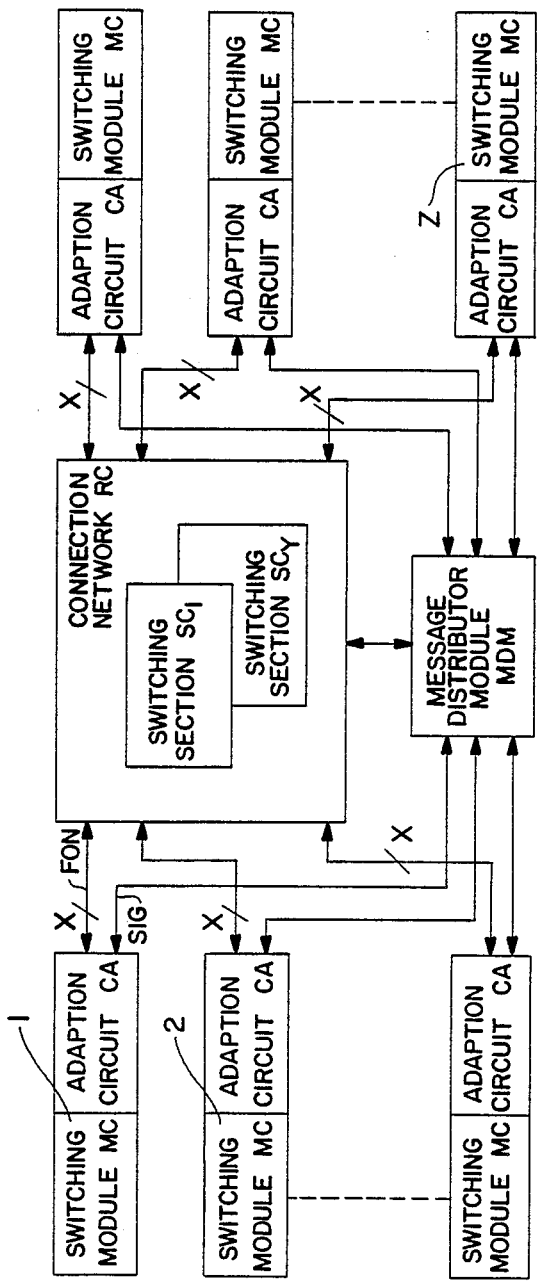
FIG. 3 illustrates a block diagram of the switched telephone exchange according to an embodiment of the present invention having a centralized connection network.

FIG. 3 illustrates a block diagram of the switched telephone exchange made according to an embodiment of the present invention which is equipped with a connection network of the centralized type having Z switching modules linked thereto. As can be seen, adaption circuits CA are associated to the MC switching modules which are fundamentally designed to:

convert the data stream being output or input from the MC switching module into a serial form or a parallel form;

align the data streams coming from the RC connection network; and manage the signal exchange between the modules.

The RC connection network includes facilities for switching voice signals having Y switching sections $SC_1, \ldots SC_Y$. Switching operations are carried out in response to the indications contained in the signal messages $SIG_T - SIG_R$ distributed within the exchange by a message distributor module MDM.

In fact, signal criteria are picked up by the MC modules, and converted into messages to be sent by respective serial transmission channels, to the MDM unit.

This is designed to switch the message to the module to which the message is addressed, whether the message is an SC section or an MC module.

In the same way as the signalling, the voice signals FON are exchanged between the RC connection network and the MC modules through serial transmission channels. In particular, each MC module has at least one serial link towards each SC switching section. Consequently, each MC module has a bundle of at least X links connected thereto. Therefore, X can assume a value greater than, or equal to Y.

In order to better understand the way operations of the structure described above, the operations required to effect a telephone link between a module MC-I to which a caller is connected and a module MC-0 to which the called party is connected, will now be described.

The MC-I module picks up an engaging operation and generates a message containing both an indicator of the called party and an indicator of the caller. This message is forwarded to the MDM unit that switches the message to the MC-0 module. One of the SC switching sections proceeds to be polled by a message forwarded through the MDM unit. If the SC section happens to have an input switching phase free in that instant, the SC section sends the message back to the MC-I module again by the MDM unit. The MC-I module then sends voice signals to the MC-0 module through the relevant serial transmission channel and the SC switching section involved in that Phase of the switching operation.

As far as the foregoing description is concerned, the link between the MC-I/O modules and the RC connection network is made by serial transmission channels connected to the CA adaption circuits which are illustrated in detail in FIG. 4. Therefore, the CA circuits effect a parallel to serial conversion, or a serial to parallel conversion, of the signal being output from, or input into, the MC modules.

By comparing FIGS. 2 and 4, it is noticed that in FIG. 4 the MT transmission multiple is connected to a voice transmission interface IFT instead of to the UT transmission unit, while the MR receiving multiple is connected to a voice receiving interface IFR instead of to the UR receiving unit.

The IFT unit is designed to organize the digital words that are input to the IFT unit in a predetermined number of PCM streams, after having carried out parallel to serial conversion operations.

The PCM streams being output from the IFT unit are forwarded to a respective line unit ULL designed to manage local alarms on the on the PCM streams, and to convert the signals being input to the respective line unit ULL into Manchester II code (henceforth called M II).

In the opposite transmission direction, the ULL units are designed to receive a predetermined number of streams of signal coded in M II code as their input. After having carried out aligning operations and conversion into NRZ code. The streams are sent to the IFR voice receiving interface.

The serial streams that are input to the IFR voice receiving interface are converted into a parallel form, and digital words, obtained from the streams, coded in parallel on 20 bits and on a bundle of 20 wires are outputted.

The CA adaption circuits also include an intermodule signalling unit USI for receiving data corresponding to the SIG signal from the $CN_1$ control circuit, sending the data in a message form to the MDM unit by a serial transmission channel, and receiving an alarm signal ALL from the ULL units. The structure and nature of the above messages are described in the European patent application No. 235,406.

Figure 5:
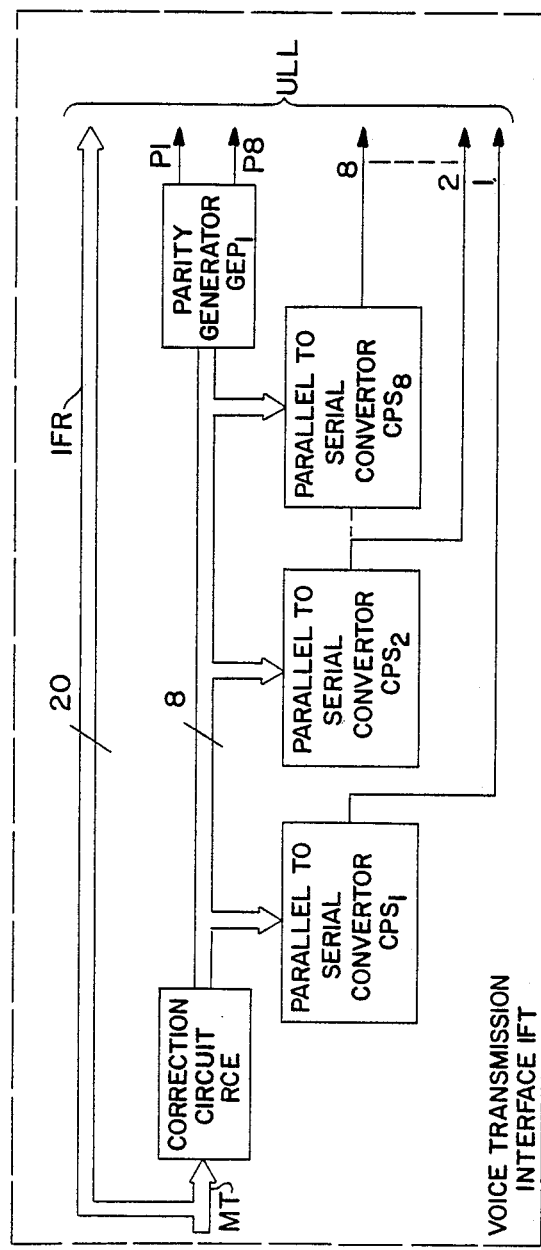
FIG. 5 illustrates a block diagram of the transmission voice interface IFT illustrated in FIG. 4.

FIG. 5 illustrates a block diagram of the IFT voice transmission interface having a bundle of 20 wires for transmitting digital words of H=20 bits in parallel. This bundle is forwarded to the IFR unit to create the loop mentioned above. The bundle is also input to a conventional error detection and correction circuit RCE for correcting the information bits by using the redundancy bits and outputting I=8 information bits in parallel.

The information bits are in turn input to a plurality of parallel to serial convertors $CPS_1, \ldots CPS_8$, whose outputs corresponds to the same number of serial streams of PCM signals. The information bits also The MC-I module picks up an engaging operation and generates a message containing both an indicator of the called party and an indicator of the caller. This message is forwarded to the MDM unit that switches the message to the MC-0 module. One of the SC switching sections proceeds to be polled by a message forwarded through the MDM unit. If the SC section happens to have an input switching phase free in that instant, the SC section sends the message back to the MC-I module again by the MDM unit. The MC-I module then sends voice signals to the MC-0 module through the relevant serial transmission channel and the SC switching section involved in that phase of the switching operation.

As far as the foregoing description is concerned, the link between the MC-I/O modules and the RC connection network is made by serial transmission channels connected to the CA adaption circuits which are illustrated in detail in FIG. 4. Therefore, the CA circuits effect a parallel to serial conversion, or a serial to parallel conversion, of the signal being output from, or input into, the MC modules.

By comparing FIGS. 2 and 4, it is noticed that in FIG. 4 the MT transmission multiple is connected to a voice transmission interface IFT instead of to the UT transmission unit, while the MR receiving multiple is connected to a voice receiving interface IFR instead of to the UR receiving unit.

The IFT unit is designed to organize the digital words that are input to the IFT unit in a predetermined number of PCM streams, after having carried out parallel to serial conversion operations.

The PCM streams being output from the IFT unit are forwarded to a respective line unit ULL designed to manage local alarms on the on the PCM streams, and to convert the signals being input to the respective line unit ULL into Manchester II code (henceforth called M II).

In the opposite transmission direction, the ULL units are designed to receive a predetermined number of streams of signal coded in M II code as their input. After having carried out aligning operations and conversion into NRZ code. The streams are sent to the IFR voice receiving interface.

The serial streams that are input to the IFR voice receiving interface are converted into a parallel form, and digital words, obtained from the streams, coded in parallel on 20 bits and on a bundle of 20 wires are outputted.

The CA adaption circuits also include an intermodule signalling unit USI for receiving data corresponding to the SIG signal from the $CN_1$ control circuit, sending the data in a message form to the MDM unit by a serial transmission channel, and receiving an alarm signal ALL from the ULL units. The structure and nature of the above messages are described in the European patent application No. 235,406.

FIG. 5 illustrates a block diagram of the IFT voice transmission interface having a bundle of 20 wires for transmitting digital words of H 20 bits in parallel. This bundle is forwarded to the IFR unit to create the loop mentioned above. The bundle is also input to a conventional error detection and correction circuit RCE for correcting the information bits by using the redundancy bits and outputting I=8 information bits in parallel.

The information bits are in turn input to a plurality of parallel to serial convertors $CPS_1, \ldots CPS_8$, whose outputs corresponds to the same number of serial streams of PCM signals. The information bits also input to a parity generator $GEP_1$ for outputting the Parity bit on outputs $P_1, \ldots P_8$ of a respective digital word corresponding to the output of the $CSP_1 \ldots, CSP_8$ units.

Figure 6:
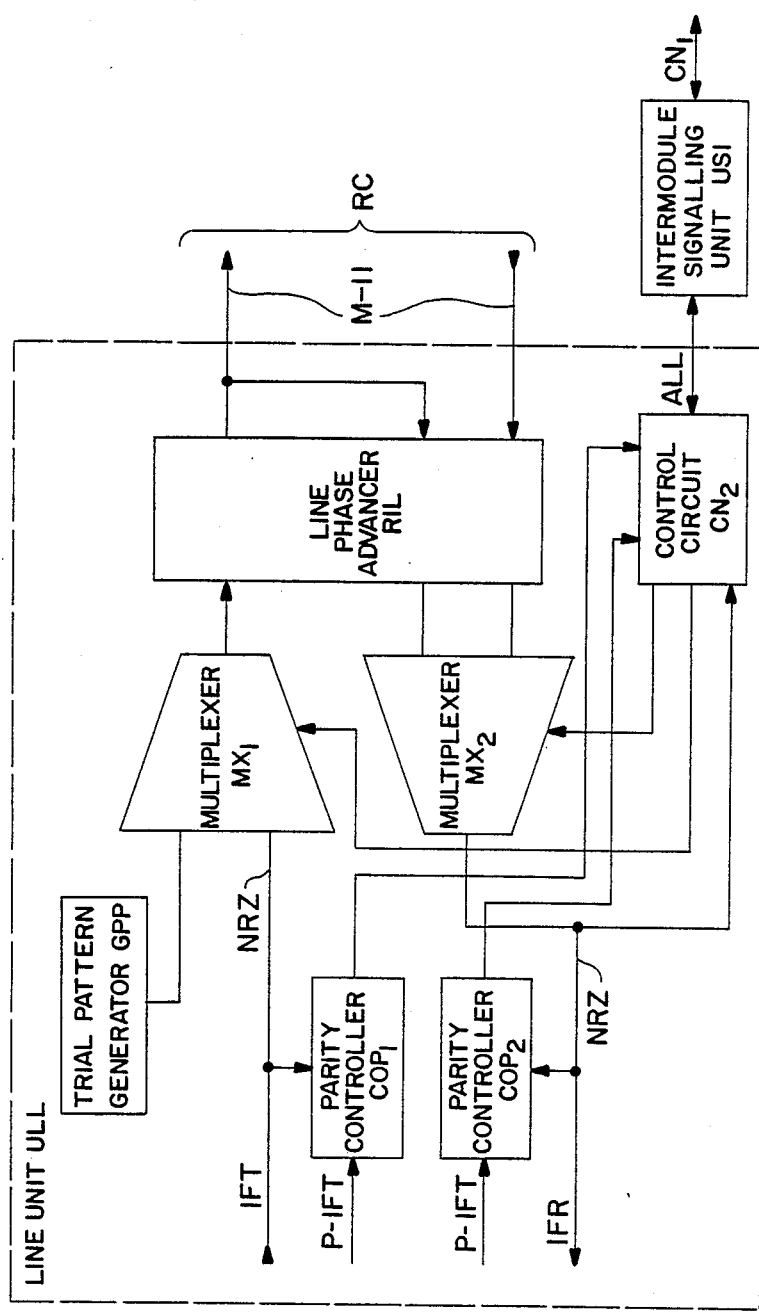
FIG. 6 illustrates a block diagram of a line unit ULL illustrated in FIG. 4.

FIG. 6 illustrates a detailed block diagram of a generical ULL unit from FIG. 4; into which a serial data stream encoded in NRZ code and coming from the IFT unit is input. This data is input to multiplexer $MX_1$, the second input of which is connected to the output of a trial pattern generator GPP. The data stream from the IFT unit is also input to a parity controller $COP_1$ designed to activate a respective output when the IFT unit detects the presence of an error which has occurred while the digital words from the IFT unit are transferred to the ULL unit.

The output of the $MX_1$ unit is input to a line phase advancer RIL (described in the International patent application No. WO 87/01006) for converting the signals expressed in the NRZ code into the M II code.

The stream of signals thus encoded is forwarded to the RC connection network of the type illustrated in FIG. 3.

In the opposite transmission direction, the RIL unit received a data stream in the M II code on its input which has been output by the RC connection network, as well as the data stream forwarded to the connection network.

The RIL unit converts these two streams from the M II code into the NRZ code, carries out aligning operations, and then forwards the streams to a respective input of multiplexer M2. The output of the multiplexer $M_2$ is input to the IFR voice receiving interface and to a second even parity bit controller $COP_2$ which activates an output thereof if an error that has occurred during the transfer of the signals from the ULL unit to the IFR unit has been detected. In order to carry out all the even paritY checks in the ULL unit, it must be remembered that the IFR unit calculates the parity bits on the received data (see FIG. 7) and sends these bits to the ULL unit.

The $MX_1$ and $MX_2$ multiplexers are controlled by a control circuit $CN_2$, which also receives the $MX_2$ output on its input for carrying out testing operations by controlling the $MX_1$ unit in such a manner so that a trial pattern is sent to the RIL unit. The trial pattern is then analyzed by the CN 2 unit through the local loop and the $MX_2$ unit for obtaining indications about the correct operation of some of the elements. The outputs of the $COP_1$ and $COP_2$ units are also input into the $CN_2$ unit which includes a link to the intermodule signalling unit USI which acts as a supervision element for the ULL units as the intermodule signalling unit USI receives any alarm signals that might be output by $CN_2$ following the testing operations described above.

In the example described above, reference has been made to a bidirectional NRZ data stream and a bidirectional M II stream. Obviously, it is possible to manage a greater number of data streams by increasing the number of inputs on both the $MX_1$ and $MX_2$ multiPlexers and the RIL unit.

FIG. 7 illustrates the block diagram of the IFR voice receiving interface which includes a plurality of serial to parallel convertors $CSP_1, \ldots CSP_8$ for receiving their respective serial data stream of the NRZ code on their inputs. Furthermore, the IFR voice receiving interface outputs in a sequential manner and in parallel form on 8 wires, the digital words that are input thereto in the form of serial stream.

The digital words available on the outputs of the CSP units are also input to redundancy code generator GRC, designed to make 8 redundancy bits available in a parallel form which have been calculated based on the information bits received at the input, of the redundancy code generator GRC as well as being input to a second even parity bits $P_1, \ldots, P_8$ concerning the digital words that are input thereto. The $GEP_2$ unit forwards the parity bit generator GEP designed to calculate the over Parity bits $P_1, \ldots, P_8$ to the ULL unit in the manner described above with the reference to FIG. 6.

The 8 bits output from the CSP units and the 8 bits output from the GRC unit are input to a first receiving memory $MER_1$ into which the 4 service bits supplied by a service bit generator GBS are also input thereto. In fact it must be recalled that in the switched exchange illustrated in FIGS. 1 and 2, the digital words are expressed by 20 bits in parallel, of which 8 bits are information bits, 8 bits are redundancy bits and 4 bits are service bits. Therefore, on the input of the MER memory, 20 bit digital words are reconstructed and written at the addresses supplied by a write counter WC through a multiplexer $MX_3$ for outputting the read addresses supplied by the control element of the module, as described in U.S. Pat. No. 4,597,075.

The digital words expressed on 20 bits in parallel that are output from the IFT unit are also input to the MER memory, the output from the IFT unit is connected to the MR receiving multiple mentioned previously with reference to FIG. 2.

FIG. 8 illustrates a block diagram of the USI unit which includes a CPU (Central Processor Unit) which has the following units connected to the bus of the CPU:

a ROM read only memory for memorizing the program which operates the CPU unit;

a CTC unit for outputting signals which time the operations carried out by the CPU unit;

a DMA unit for carrying out memory direct transfer operations;

an S10 unit for serializing and forwarding to the MDM message distributor module and the ULL line facilities, the digital words that are input to the S10 unit in a parallel form, and also carrying out the complementary operation in the opposite transmission direction; and a buffer storage MET for carrying out an information exchange between the CPU unit and the $CN_1$ unit.

When the control circuit $CN_1$ of the MC module receives the data corresponding to the signalling criteria from the UA access unit, the control circuit $CN_1$ transfers the data to the MET buffer storage which is then read by the CPU unit.

This unit then generates a message structured by the operating program stored in the ROM unit and also forwards the message to the MDM unit through the DMA and S10 units.

The CPU unit also receives alarm signals from the ULL units as was previously described with reference to FIG. 6

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A telephone switching exchange system comprising:
    a plurality of switching modules for inputting and outputting digital words on a voice connection network, wherein said digital words are in a parallel form coded on a first number H of bits having a second number I of information bits, a third number R of redundancy bits, and a fourth number S of service bits, each said module comprising at least an access unit, first and second concentration units, and a control circuit, and each of said switching modules comprising an adaptation circuit for mutually connecting said modules through a full mesh type connection network and a centralized type connection network having a plurality of sections for switching voice signals and a message distributor module for switching signalling, each of said adaption circuits including,
    parallel to serial conversion means for receiving a data stream containing said digital words in a parallel form at an input thereof encoded on said first number H of bits from an output of said first concentration unit and converting said data stream into a plurality of data streams containing said digital words in a serial form encoded on said second number I of bits, a plurality of line means for receiving said serial data streams at an input thereof being output by said parallel to serial conversion means or said voice connection network after performing alignment operations on said serial data streams, and forwarding said serial data streams to said voice connection network or serial to parallel conversion means after performing code conversion operations, signal processing means for receiving and forwarding words corresponding to signals detected by said access unit to said control circuit, structuring said words in a message form and exchanging said messages with said message distributor module, and serial to parallel conversion means for receiving said plurality of data streams from said plurality of line means containing said digital words in a serial form encoded on said second number I of bits, and converting said data streams into a converted data stream containing digital words in a parallel form encoded on said first number H of bits.

2. A switched telephone exchange system as defined in claim 1, wherein said parallel to serial conversion facilities comprises:

an error detection and correction circuit for receiving a first data steam in a parallel form encoded on said first number H of bits on an input thereof, outputting said data stream by said concentration unit, and converting said data stream into a second data stream in a parallel form, encoded on said second number I of bits;

a plurality of parallel to serial convertors for converting said second data stream from an output of said error detection and correction circuit into a plurality of serial data streams;

a connection loop for forwarding said first data stream at the input of said error detection and correction circuit to said serial to parallel conversion means; and a first even parity bit generator for receiving on an input thereof said second number I of information bits of each digital word being input to said parallel to serial conversion means and forwarding parity bits calculated from said second number I of information bits to said line means.

3. A switched telephone exchange system as defined in claim 1, wherein sid line means comprises:

a first multiplexer for receiving on a first input at least a serial data stream and on a second input an output of a trial pattern generator;

a line phase advancer circuit for forwarding to said voice connection network or said serial to parallel conversion means, the digital words that are input thereto after performing an alignment operation and a code conversion operation;

a second multiplexer for receiving on an input the data streams from the output of said line phase advancer circuit which are output from or are forwarded to said connection network;

a first event parity bit control circuit connected to the first input of said first multiplexer for receiving said parity bits calculated by said parallel to serial conversion means input thereto;

a second event parity bit control circuit connected to an output of said second multiplexer for receiving said parity bits calculated by said serial to parallel conversion means input thereto; and a second control circuit for controlling sid first and second multiplexers, receiving said data stream output by said second multiplexer at an input thereof, extracting digital words from said data streams corresponding to testing operations, receiving the outputs from said first and second even parity bit control circuits at an input thereof, and forwarding to said signal processing means alarm signals received from said units connected thereto.

4. A telephone exchange system as defined in claim 1, wherein said serial to parallel conversion means comprises:

a plurality of serial to parallel convertors for receiving a plurality of serial data streams at an input thereof containing digital words encoded on said second number I of bits and outputting a data stream in a parallel form on said second number I of wires;

a receiving memory having a predetermined number of storage areas for receiving said first number H of bits in a parallel form at an input thereof by a loop of said parallel to serial conversion means, said second number I of bits output from said serial to parallel convertors in a parallel form, said third number R of redundancy bits supplied by a parity code generator, and said fourth number S of service bits supplied by a service bit generator;

a third multiplexer for supplying write-read addresses to said receiving memory and receiving the outputs of a write address generator on a first input and read addresses supplied by said first control circuit on a second input; and a second parity bit generator connected to an output of said serial to parallel convertors for calculating said parity bits of the words input thereto and forwarding said parity bits to said line means.

5. A telephone exchange system as defined in claim 1, wherein said signal processing means comprises;

a CPU having a bus;

a read only memory connected to said bus for memorizing a program for operating said CPU;

a timing unit connected to said bus for outputting timing signals which time the operations carried out by said CPU;

a memory transfer unit for performing memory direct transfer operations;

a transmitting unit for serializing and forwarding to said message distributor module and said line means, the digital words that are input thereto in a parallel form, and carrying out a complementary operation in an opposite transmission direction; and a buffer storage for performing an information exchange between said CPU nd said first control circuit.

* * * * *